United States Patent Office 3,425,796
Patented Feb. 4, 1969

3,425,796
PREPARATION OF METAL OXYCHLORIDES
David L. Bauer, Concord, Calif., assignor to The Dow Chemical Company, Midland, Mich., a corporation of Delaware
No Drawing. Filed May 15, 1967, Ser. No. 638,652
U.S. Cl. 23—86
Int. Cl. C01b 11/06
5 Claims

ABSTRACT OF THE DISCLOSURE

A process for preparing metal oxyhalides and particularly concentrated solutions of titanium oxychloride having low Cl/Ti molar proportions. The process comprises contacting a metal halide capable of forming an oxyhalide with ice while maintaining the reaction conditions such that substantially no liquid water is present in the reaction mixture.

BACKGROUND OF THE INVENTION

The present invention relates to the preparation of metal oxyhalide solutions and more particularly is concerned with a novel process for preparing concentrated titanium oxychloride solutions.

Heretofore titanium oxychloride solutions corresponding to the theoretical formula ($TiOCl_2$) have been prepared by pouring liquid titanium tetrachloride ($TiCl_4$) into cold water, e.g. water containing ice, or by pouring the liquid titanium tetrachloride over cracked or crushed ice. This method suffers from the problems and disadvantages that the reaction is hard to control, results in the production of great clouds of smoke and fumes with accompanying titanium losses and produces large amounts of heat of reaction. In this process as practiced heretofore, solutions containing low titanium values in the range of from about 30 to about 50 grams per liter and having high Cl/Ti molar ratios are obtained.

In a second known procedure, $TiCl_4$ is reacted with water at high temperatures in the vapor phase. The product from this reaction is a substantially water insoluble solid titanium oxide product.

Neither of these known processes gives directly solutions which are highly concentrated in titanium and neither permits or assures close control of the reaction conditions. Further, to obtain concentrated titanium oxychloride solutions from the product of the first of these known processes it is necessary to subject the dilute solutions to evaporative concentration. This operation makes it virtually impossible to control chloride levels, particularly at Cl/Ti ratios below about 2.5.

It is a principal object of the present invention to provide a process for directly preparing metal oxyhalide solutions, particularly titanium oxychloride, which as produced are concentrated with respect to the metal oxyhalide.

It is also an object of the present invention to provide a novel process for preparing highly water soluble titanium oxychloride solutions having a high titanium concentration and controlled chloride content.

It is another object of the present invention to provide a process for preparing highly concentrated titanium oxychloride solutions wherein there is effective control of the rate of heat generation during the process reaction.

It is also an object of the present invention to provide a simple process for the preparation of substantially anhydrous hydrogen halides and deuterium halides in good yield and readily recoverable form.

These and other objects and advantages readily will become apparent from the detailed description presented hereinafter.

SUMMARY OF THE INVENTION

In general the present process comprises contacting ice with a substantially anhydrous metal polyhalide having an empirical formula $MX_n$, where M is a polyvalent cation, X is a halogen and $n$ is an integer of at least 2 and which is capable of forming an oxyhalide wherein the ice is brought into contact with the metal polyhalide at a rate and under temperature conditions such that it is consumed by the hydrolysis reaction at the metal polyhalide-ice interface without formation of substantially any liquid water. The coproduced hydrogen halide is removed from the reaction mass and the resulting highly concentrated metal oxychloride solution recovered and/or used directly. The term "hydrogen halide" as used herein is meant to include both hydrogen halide (HX) and deuterium halide (DX). The term "ice" includes both frozen $H_2O$ and $D_2O$.

Because of the absence of any apparent quantities of liquid water during the reaction, the process is indicated to be a solid phase hydrolysis.

Optimum product yield and the recovery of concentrated metal oxychloride solutions, for example, having low Cl/M molar ratios approaching theoretical are realized by the practice of the invention when the ice, i.e. solid $H_2O$ or $D_2O$, addition rate and temperature of the reaction mass are such that there is no liquid water present. This assures that essentially all of the coproduced HCl or DCl formed in the hydrolysis reaction escapes or easily is removed from the reaction zone.

Ordinarily, the ice is added at such a rate that at a maximum there are stoichiometric quantities of reactants, i.e. solid reactant surfaces. This assures that the coproduced hydrogen halide, as it is formed, leaves the reaction mixture as an anhydrous gas because any liquid water which may be produced is only transiently present and is immediately consumed in the reaction. Thus the hydrogen halide is not dissolved and held by water. This assures that no undesirably high halide/metal ratios result in the product as is common in liquid $TiCl_4$-$H_2O$ process practiced heretofore. After the reaction has been completed and all the multivalent metal halide reacted, the product solution can be diluted directly with water or ice without affecting its halide/metal molar ratio.

Those solid metal polyhalide reactants which are liquid at room temperature, e.g. $TiCl_4$, which melts at about minus 25–30 C., usually are cooled to a temperature such that they are solidified before starting the ice addition. At all times the temperature of the reaction mixture is maintained such that the water or deuterium oxide remains frozen. With $H_2O$ this temperature will be at or below 0° C. and with $D_2O$ a maximum reaction temperature of about 3.8° C. is permissible.

Metal polyhalides suitable for use in the practice of the present invention are those salts wherein the metal constituent (M) is titanium, zirconium, tin, arsenic, antimony and the like. The halide (X) usually is chloride.

Titanium tetrachloride has been found to be of particular importance since the corresponding titanium oxychloride solutions have a number of utilities. To illustrate: Concentrated titanyl chloride ($TiOCl_2$) solutions are suitable for use in the preparation of seed solutions for the hydrolysis of titanium chlorides to rutile titanium dioxide. Additionally, the highly concentrated titanyl chloride solutions having low Cl/Ti molar ratios, i.e. less than about 2.5, can be used to form titanium containing solutions of various concentrations, to maintain low chloride to titanium ratios in solutions and for increasing the titanium content of titanium containing solutions prepared by other means.

Zirconyl chloride ($ZrOCl_2$) has been found to be suitable for use as a catalyst and as a water-proofing agent for resinous materials.

An unexpected utility of the present process is that essentially anhydrous DCl (deuterium chloride) is prepared as an easily recoverable product in a readily controlled manner using solid $D_2O$. This method assures a desirable high recovery rate of deuterium.

Ordinarily, the process is carried out at atmospheric pressures. However, either subatmospheric or superatmospheric pressures can be employed if desired. It is recognized that if superatmospheric pressures are used, some hydrogen halide co-product may be held by the metal oxyhalide product. However, by following the disclosed operating conditions, since no liquid water is present, when the pressure is released on the product mass substantially all of the gaseous hydrogen halide escapes from the concentrated oxyhalide solution.

DESCRIPTION OF PREFERRED EMBODIMENT

In a preferred embodiment of the present novel process, titanium tetrachloride and ice are mixed together in quantities such that the molar proportion of $TiCl_4$/ice is about that stoichiometrically required for formation of the corresponding titanyl chloride, $TiOCl_2$, having a Cl/Ti molar ratio of about 2.

In this preparation, the titanium tetrachloride is cooled initially to about minus 25–30° C., preferably to about minus 40° C., and ice added at a rate such that there is no liquid water apparent and the temperature of the reaction mixture does not rise above the melting point of the ice. Ordinarily ice in a relatively finely divided state is used. Such chipped, shaved, flake or other particulate form of ice provides for ready control of the reaction rate and also a maximum of solid reactant surface.

As the ice addition is continued, a frothy, semi-solid phase usually forms. This is very high in titanium. Since this phase is viscous, ordinarily it is agitated to facilitate removal of the substantially anhydrous gaseous HCl or DCl co-product therefrom.

The following example will serve to further illustrate the present invention but is not meant to limit it thereto.

Example.—About 820 grams (~4.3 gram mole) of titanium tetrachloride was solidified at a temperature of about minus 40° C. in a two liter beaker. About 77.4 grams (~4.3 gram moles) of ice prepared from distilled water was added slowly while agitating the reaction mixture. The ice addition was controlled to assure that substantially no free water was present and at all times the temperature of the reaction mixture was maintained below 0° C. During the entire reaction period, gaseous HCl was evolved and removed from the mass.

After the reaction was complete, the product was a viscous solution of density about 1.5 grams/cc. Analysis indiated a titanium concentration of about 400 grams per liter. The Cl/Ti molar proportions were 2.2/1.

The product solution was hygroscopic. However, when allowed to stand protected from atmospheric moisture, crystals having a characteristic X-ray diffraction pattern formed in the concentrated liquid titanium oxychloride product mass.

The crystals and product solution both were water soluble. The product solution after dilution with water exhibited the same Cl/Ti molar ratio as the initial concentrated product solution.

By following this same procedure, frozen $D_2O$ can be reacted with solidified $TiCl_4$ at a temperature below about 3.8° C. to produce a concentrated titanium oxychloride solution and substantially anhydrous gaseous deuterium chloride which, as it evolves, can be separated from the reaction mass and recovered.

This procedure was repeated a number of times using quantities of the titanium tetrachloride reactant ranging from about 10 to over 2,000 grams per run wherein the titanium tetrachloride had been cooled to at least about minus 25° C. In each case about stoichiometric amounts of ice were used.

The resulting titanium oxychloride product solutions ranged from about 175 to over 400 grams/liter in titanium and showed Cl/Ti molar proportions ranging from about 2.05 to about 2.5.

In a manner similar to that set forth in the preceding example, zirconium tetrachloride can be reacted with ice to prepare concentrated zirconium oxychloride solutions. Likewise other polyvalent metal oxyhalides can be prepared using polyvalent metal halide reactants of the type disclosed herein.

Various modifications can be made in the present invention without departing from the spirit or scope thereof for it is understood that I limit myself only as defined in the appended claims.

I claim:
1. A process for preparing concentrated metal oxychloride solutions which comprises:
    (a) contacting ice with a substantially anhydrous metal polychloride having an empirical formula $MX_n$ where M is a polyvalent cation, X is chlorine and $n$ is an integer of at least 2, said metal polychloride being capable of forming an oxychloride,
    (b) maintaining the temperature of the reaction mixture below about 0° C. and the rate of ice addition to the reaction mixture such that said ice is consumed by the hydrolysis reaction at the metal polychloride-ice interface substantially without formation of any liquid water,
    (c) removing coproduced hydrogen chloride from the reaction mass, and
    (d) recovering a concentrated metal oxychloride solution.

2. The process as defined in claim 1 wherein the metal polychloride is titanium tetrachloride and including the initial step of cooling said titanium tetrachloride to solidify this material before contacting said titanium tetrachloride with said ice.

3. The process as defined in claim 2 wherein said titanium tetrachloride is cooled to a temperature of at least about minus 40° C. prior to contacting said titanium tetrachloride with ice.

4. The process as defined in claim 2 wherein the relative quantities of titanium tetrachloride and ice reactants are about that stoichiometrically required for preparation of titanium oxychloride corresponding to the empirical formula $TiOCl_2$.

5. The process as defined in claim 2 wherein the ice is $D_2O$ and including the step of recovering the substantially anhydrous deuterium chloride co-product.

References Cited
UNITED STATES PATENTS

| | | | |
|---|---|---|---|
| 2,942,944 | 6/1960 | Wilhelm et al. | 23—154 XR |
| 3,057,678 | 10/1962 | Clearfield | 23—85 |
| 3,063,797 | 11/1962 | Hildreth | 23—85 |
| 3,179,494 | 4/1965 | Regenbogen | 23—85 |

EDWARD STERN, Primary Examiner.

U.S. Cl. X.R.

23—154